US008577130B2

(12) United States Patent
Dewan et al.

(10) Patent No.: US 8,577,130 B2
(45) Date of Patent: *Nov. 5, 2013

(54) HIERARCHICAL DEFORMABLE MODEL FOR IMAGE SEGMENTATION

(75) Inventors: Maneesh Dewan, West Chester, PA (US); Yiqiang Zhan, Berwyn, PA (US); Xiang Sean Zhou, Exton, PA (US); Zhao Yi, Pasadena, CA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 770 days.

This patent is subject to a terminal disclaimer.

(21) Appl. No.: 12/723,909

(22) Filed: Mar. 15, 2010

(65) Prior Publication Data

US 2010/0232686 A1    Sep. 16, 2010

Related U.S. Application Data

(60) Provisional application No. 61/160,560, filed on Mar. 16, 2009, provisional application No. 61/244,502, filed on Sep. 22, 2009.

(51) Int. Cl.
*G06K 9/62* (2006.01)

(52) U.S. Cl.
USPC ........... 382/159; 382/108; 382/155; 382/156; 382/157; 382/158; 707/802; 707/803

(58) Field of Classification Search
CPC ........... G06K 9/6292; G06K 9/00422; G06K 9/6282; G06K 9/00147
USPC ................ 382/159, 108, 155, 156, 157, 158; 707/802, 803
See application file for complete search history.

(56) References Cited

U.S. PATENT DOCUMENTS

| | | | |
|---|---|---|---|
| 2002/0165837 A1* | 11/2002 | Zhang et al. | 706/16 |
| 2006/0013509 A1* | 1/2006 | Kee et al. | 382/312 |
| 2006/0115145 A1* | 6/2006 | Bishop et al. | 382/155 |
| 2007/0041638 A1* | 2/2007 | Liu et al. | 382/170 |
| 2008/0133479 A1* | 6/2008 | Zelevinsky et al. | 707/3 |
| 2010/0189320 A1* | 7/2010 | Dewaele | 382/128 |

OTHER PUBLICATIONS

Zhan Y., Shen D., Deformable segmentation of 3-d ultrasound prostate images using statistical texture matching method, IEEE Trans. Med. Imaging 25 (2006) 256-272.

Cortes, C. and Vapnik, V., "Support Vector Networks," Machine Learning, 20:273-297 (1995).

Frey and Dueck, "Clustering by Passing Messages Between Data Points," Science, vol. 315 pp. 972-976 (2007).

Paul Viola and Michael J. Jones, "Robust Real-Time Object Detection," International Conference on Computer Vision, 57(2): 137-154 (2004).

Breiman, Leo, "Random Forests," Machine Learning, 45(1): 5-32 (2001).

(Continued)

*Primary Examiner* — Mike Rahmjoo
(74) *Attorney, Agent, or Firm* — Peter R. Withstandley

(57) ABSTRACT

Described herein is a technology for facilitating deformable model-based segmentation of image data. In one implementation, the technology includes receiving training image data (202) and automatically constructing a hierarchical structure (204) based on the training image data. At least one spatially adaptive boundary detector is learned based on a node of the hierarchical structure (206).

23 Claims, 12 Drawing Sheets

(56) References Cited

OTHER PUBLICATIONS

Cootes, T., and Taylor, C.J., Cooper, D.H., Graham, J., "Active shape models—their training and application," Computer Vision and Image Understanding, 61(1): 38-59 (1995).

Vese, L., Chan, T.F.: A multiphase level set framework for image segmentation using the mumford and shah model. International Journal of Computer Vision 50(3) (2002) 271-293.

Ronfard, R.: Region-based strategies for active contour models. International Journal of Computer Vision 13(2) (1994) 229251.

Huang, X., Metaxas, D., Chen, T.: Metamorphs: Deformable shape and texture models. In: CVPR 2004. (2004) 496-503.

Pham, D.L., Xu, C., Prince, J.L.: Current methods in medical image segmentation. Annual Review of Biomedical Engineering 2 (2000) 315-338.

Xu, C., Prince, J.L.: Snakes, shapes, and gradient vector ° ow. IEEE Transactions on Image Processing 7(3) (1998) 359-369.

Zheng, Y., Barbu, A., Georgescu, B., Scheuering, M., Comaniciu, D.: Four-chamber heart modeling and automatic segmentation for 3-d cardiac ct volums using marginal space learning and steerable features. IEEE Transactions on Medical Imaging 27(11) (2008) 1668-1681.

Shen, D., Davatzikos, C.: An adaptive-focus deformable model using statistical and geometric information. IEEE PAMI 22(8) (2000) 906-913.

D. G. Eckho® et. al.: Three-dimensional morphology and kinematics of the distal part of the femur viewed in virtual reality. Journal of Bone and Joint Surgery 85 (2003) 97-104.

\* cited by examiner

|         | Med Surf. Dist.(voxel) | Avg Surf. Dist (voxel) | Vol. Diff. (%) | Overlap Diff. (%) |
|---------|------------------------|------------------------|----------------|-------------------|
| Method1 | 0.84                   | 1.01                   | 3.13           | 7.61              |
| Method2 | 1.27                   | 1.61                   | 5.16           | 12.1              |

Fig. 10

HIERARCHICAL DEFORMABLE MODEL FOR IMAGE SEGMENTATION

CROSS-REFERENCE TO RELATED APPLICATIONS

The present application claims the benefit of U.S. provisional application No. 61/160,560 filed Mar. 16, 2009, and U.S. provisional application No. 61/244,502 filed Sep. 22, 2009, the entire contents of which are hereby incorporated by reference.

TECHNICAL FIELD

The present disclosure relates generally to segmentation of image data and, more specifically, to a technology for facilitating hierarchical deformable model-based segmentation of image data.

BACKGROUND

In recent decades, segmentation methods have become increasingly important in facilitating radiological and diagnostic tasks. Segmentation methods may be used to automatically identify regions of interest, such as bones or organs, in medical images acquired by various imaging modalities (e.g., magnetic resonance imaging or computed tomography). Therefore, it is not surprising that there have been a multitude of segmentation methods developed in recent years.

In spite of the availability of these segmentation methods, it is generally not easy to apply a particular method to another structure and/or imaging modality. Generic segmentation of organs in medical images is a very challenging task, due to the changing characteristics of different organs, large variations of deformable organs, strong dependence on prior knowledge, different imaging properties of multiple modalities, and many other factors. As a result, each segmentation method is typically tailored towards a specific anatomical structure (e.g., prostate or heart) and specific imaging modality (e.g., computed tomography). Key parameters in the deformable model have to be adjusted in order for the method to work in another specific application.

These manual adjustments are often very time consuming and ineffective. Therefore, there is a need to provide a more generic segmentation model that is directly applicable to different imaging modalities and different surfaces or structures, without the need to make major adjustments to parameters of the segmentation model when used in another application.

SUMMARY

A technology for facilitating deformable model-based segmentation of image data is described herein. In one implementation, the technology includes receiving training image data and automatically constructing a hierarchical structure based on the training image data. At least one spatially adaptive boundary detector is learned based on a node of the hierarchical structure.

According to one aspect of the present invention, a method for facilitating deformable model-based segmentation of image data is provided. The method including receiving, by a computer system, training image data, automatically constructing by the computer system, based on the training image data, a hierarchical structure comprising multiple nodes, wherein a node represents a cluster of vertices having relatively similar characteristics, and learning, by the computer system, at least one spatially adaptive boundary detector based on a node of the hierarchical structure. The step of automatically constructing the hierarchical structure can include performing an iterative process comprising clustering the training image data to form a node of the hierarchical structure, and selecting a set of features for a next level of the clustering. The step of clustering can include applying affinity propagation to the training image data. The method can include determining an initial set of features for the clustering by determining an intensity profile along a normal of a vertex. The step of selecting the set of features can include selecting the features with the highest accuracies for classification. The step of selecting the set of features can include applying an AdaBoost method. The step of selecting the set of features can include applying a random forest-based method. The step of learning the at least one spatially adaptive boundary detector can include applying a supervised learning method. The step of learning the at least one spatially adaptive boundary detector can include applying an AdaBoost method. The step of learning the at least one spatially adaptive boundary detector can include applying a random forest-based method. The step of learning the at least one spatially adaptive boundary detector can include applying a support vector-based method. The hierarchical structure can include a binary decision tree. The hierarchical stricture can include a clustering tree and multiple cluster node classifiers constructed at clustering leaf nodes of the clustering tree. The step of automatically constructing the hierarchical structure can include performing a process including: if a divergence between positive and negative samples in a node of the hierarchical structure is less than a pre-determined threshold, splitting the node by performing clustering based on selected features. The divergences may include a Kullback-Leibler (KL) divergence. The method can include selecting features for the clustering by randomly sampling from an extensive redundant feature pool. The step of splitting the node can include performing clustering of vertices in the node. The step of performing the clustering can include forming vertices, constructing a feature vector for a vertex, and performing two-center clustering of the vertices based on pair-wise similarities between the vertices. The step of forming the vertices can include grouping at least one positive sample and at least one negative sample. The step of constructing the feature vector can include applying a weak feature on voxels of the vertex. The method can include clustering shape instances in the training image data, and constructing multiple active shape models, based on the clustered shape instances, for constraining the deformable model-based segmentation.

According to another aspect of the present invention, a method of image segmentation is provided, comprising receiving, by a computer system, an input image, initializing, by the computer system, a deformable model, and performing, by the computer system, deformation on vertices of the input image using a hierarchical structure with spatially adaptive boundary detectors to guide the deformable model to a boundary, wherein the hierarchical structure is automatically constructed, by the computer system, based on training image data, and wherein a node of the hierarchical structure represents vertices that are driven in response to a same boundary detector.

According to yet another aspect of the present invention, a computer usable medium having a computer readable program code tangibly embodied therein is provided. The computer readable program code being adapted to be executed by a processor to implement a method for facilitating deformable model-based segmentation of image data, comprising receiving training image data, automatically constructing, based on the training image data, a hierarchical structure comprising multiple nodes, wherein a node represents a cluster of vertices having relatively similar characteristics, and learning at least one spatially adaptive boundary detector based on a node of the hierarchical structure.

According to another aspect of the present invention, a system for facilitating deformable model-based segmentation of image data is provided comprising a memory device for storing computer readable program code, and a processor in communication with the memory device, the processor being operative with the computer readable program code to receive training image data, automatically construct, based on the training image data, a hierarchical structure comprising multiple nodes, wherein a node represents a cluster of vertices having relatively similar characteristics, and learn at least one spatially adaptive boundary detector based on a node of the hierarchical structure.

BRIEF DESCRIPTION OF THE DRAWINGS

The same numbers are used throughout the drawings to reference like elements and features.

FIG. 10 shows a quantitative comparison of PET-CT liver segmentation methods.

DETAILED DESCRIPTION

Figure 1:
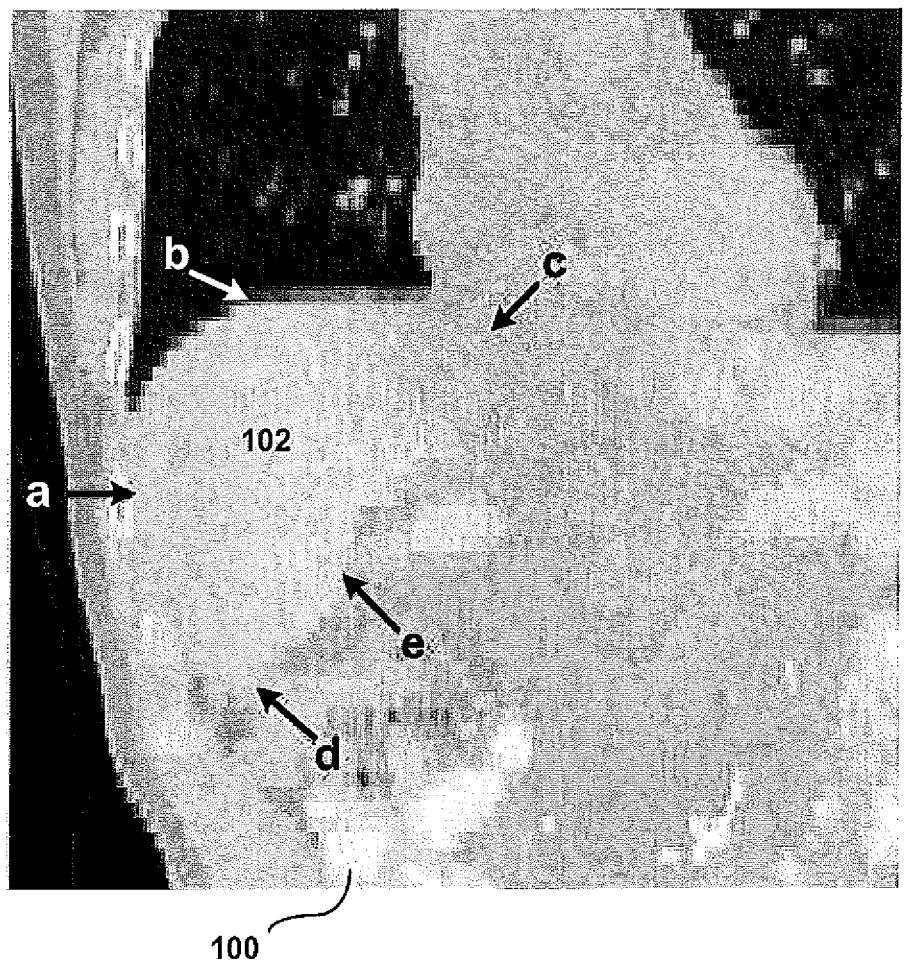
FIG. 1 shows an example of a liver CT image.

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of present frameworks and methods, and to thereby better explain the present frameworks and methods. Furthermore, for ease of understanding, certain method steps are delineated as separate steps; however, these separately delineated steps should not be construed as necessarily order dependent in their performance.

A framework for automatically constructing a hierarchical deformable model is described herein. The hierarchical model may be used to facilitate segmentation of regions of interest in image data. In one implementation, the hierarchical model includes spatially adaptive boundary detectors for detecting boundaries delineating regions of interest. One major advantage of the present framework is that it allows for generic segmentation of images, and may be directly applied to a new surface (or structure) of another imaging modality, without requiring a change in parameters in the deformable model. At most, the changes that may be required are the annotation of new training samples.

One aspect of the present framework automatically constructs the deformable hierarchical model from training samples. The boundary appearance of the region of interest in the training samples may be hierarchically modeled and learned in a spatially adaptive way. In one implementation, the vertices of the deformable model are hierarchically clustered into a set of nodes (or sub-surfaces) based on geometric and appearance similarities. The appearance characteristics of each node may then be captured by spatially adaptive boundary detectors learned using, for example, a machine learning method.

Another aspect of the present framework clusters shape instances of the training image data to build multiple statistical shape models to incorporate non-Gaussian shape priors. Since each cluster of shape instances represents one of the distribution modes in the shape space, multiple statistical shape models are able to provide more "specific" refinement to the deformable model.

Overview

Deformable models are curves or surfaces that move under the influence of internal forces and external forces. The deformation process is formulated as an optimization problem, with an objective function comprising an external energy term and internal energy term. The internal energy is designed to preserve the geometric characteristics or shape of the organ under study, and is defined within the curve or surface itself. The external energy is defined to move the deformable model toward organ boundaries, and is computed from image data. Typically, the external energy term is derived from edge information (e.g., image gradient), local regional information or texture models. However, such external energy terms are usually designed for a specific imaging modality and structure, and therefore lack scalability to different medical imaging modalities or structures.

The exemplary deformable model may be represented by a triangle mesh: $S \equiv (V,T)$, where $V = \{v_i | i=1, \ldots, N\}$ denotes the vertices of the sub-surface S and $T = \{t_j | j=1, \ldots, M\}$ denotes the triangles defined by the vertices. A vertex may comprise one or more voxels (or pixels) in the image data.

Mathematically, the segmentation problem may be formulated as the minimization of an energy function (1):

$$E(S) = E_{ext}(S) + E_{int}(S) \qquad (1)$$

$$= \sum_{i=1}^{N} E_{ext}(v_i) + E_{int}(S)$$

where $E_{ext}$ and $E_{int}$ are image (external) energy and shape (internal) energy terms.

A hierarchical deformation strategy may be employed to solve this high dimensional optimization problem. In order to avoid the chances of a local minima, the present framework may use an optimization strategy, such as the one described in Zhan Y., Shen D., *Deformable segmentation of 3-d ultrasound prostate images using statistical texture matching method*, IEEE Trans. Med. Imaging 25 (2006) 256-272, the entire contents of which are hereby incorporated by reference.

Learning-based methods capture boundary characteristics from training data. The "design" of external energy using such learning-based methods is data driven and extendable to different imaging modalities. However, a potential problem is that the boundary characteristics of organs can seldom be learned by a single classifier due to heterogeneous characteristics along organ boundaries.

FIG. 1 shows an example of a heterogeneous appearance of a computed tomography (CT) image 100. The arrows a to e point to boundary points between the liver region 102 and the rib, lung, heart, abdomen and colon. As shown, the boundaries between the liver region 102 and different adjacent organs are very heterogeneous and deformable. A single classifier does not capture such heterogeneous boundary characteristics very well. This is because the positive samples (i.e. boundary voxels) and negative samples (i.e. non-boundary voxels) that are used for training the single classifier have very similar appearances globally, thereby causing a big overlap in the feature space. In addition, the positive and negative samples may exhibit multi-modal appearances and vary locally in different ways.

To address this problem, a "divide-and-conquer" strategy may be used. More specifically, the deformable model may be decomposed into a set of sub-surfaces with relatively similar boundary characteristics. For example, the sub-surfaces may be defined around boundary points a, b, c, d and e. The boundary points a to e are typically defined manually or based on heuristics. However, such heuristic methods are undesirable because they are not mathematically proven to meet a given set of requirements. In addition, heuristic methods are not generic, and therefore not directly applicable to a different imaging modality or another anatomical structure (or organ). To use such heuristic methods for another imaging modality or structure, the manual heuristics have to be re-defined, which is a highly labor-intensive task.

The present framework presents a non-heuristic approach to automatically construct a hierarchical and spatially adaptive deformable model that is portable between different imaging modalities and different structures. The efficiency, accuracy and robustness of segmentation based on such model are greatly enhanced. In one implementation, the deformable model is purely data driven. The hierarchical structure of the deformable model may be automatically constructed from a set of training data.

One implementation of the present framework uses both a bottom-up approach and a top-down approach. The bottom-up approach uses learning-based boundary identification. In particular, the ensemble of learned boundary detectors captures the appearance characteristics of the structure in the image data. The responses from these learned boundary detectors guide the deformable model to the desired boundary of the structure. The top-down approach uses shape constraints to constrain the deformable model during the application (or run-time) stage. The shape constraints may be based on a set of statistical active shape models built upon clustered shape instances, as will be described in further detail later.

Training Stage

Figure 2:
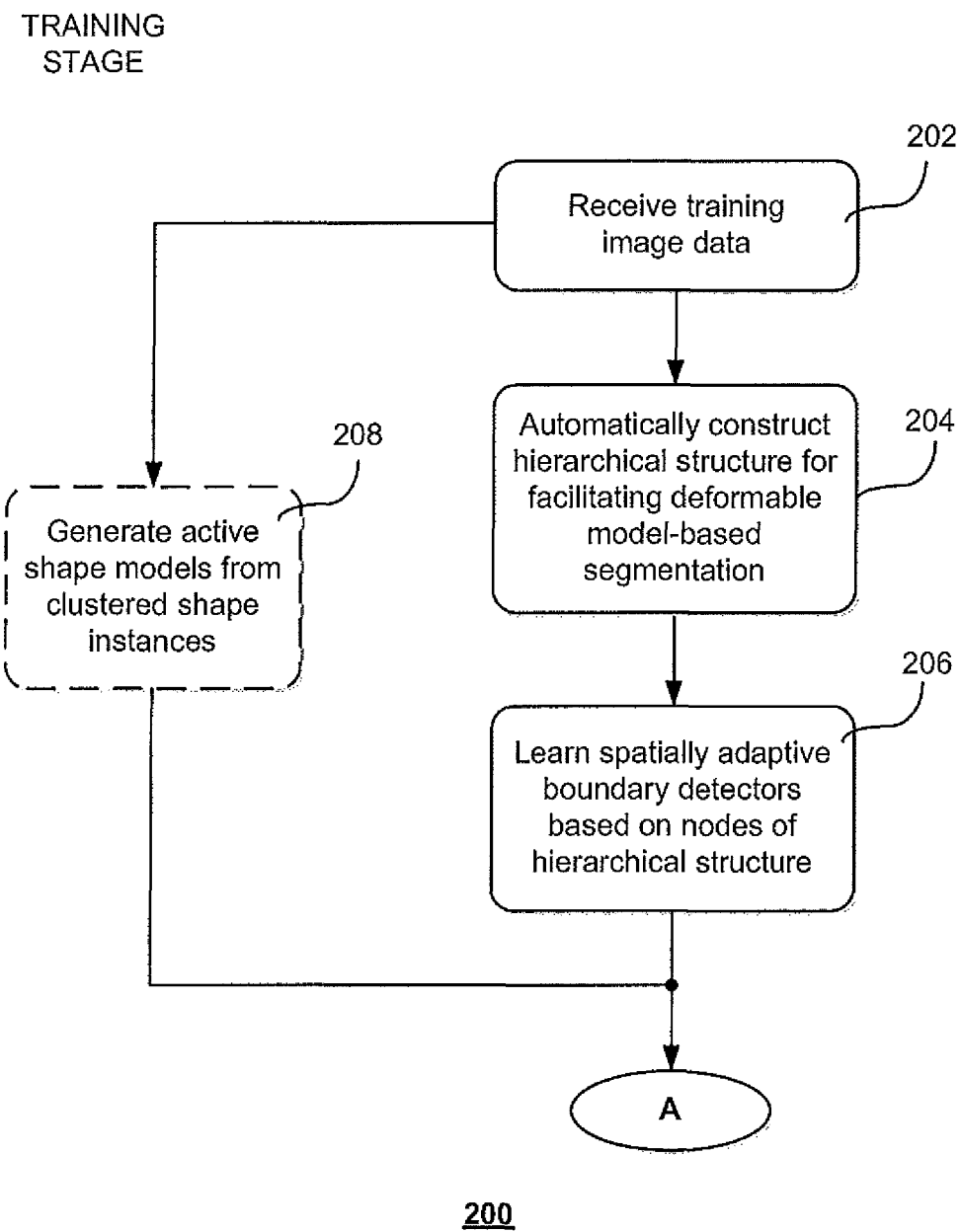
FIG. 2 shows a flowchart of an exemplary training stage.

FIG. 2 shows the exemplary steps that may be carried out during the training (i.e., offline or learning) stage to generate a hierarchical deformable model structure and learned boundary detectors to facilitate deformable model-based segmentation of image data. Responses to the boundary detectors are used to define the external energy term $E_{ext}$ (previously described in Equation (1)). The internal energy term $E_{int}$, which was also previously described in Equation (1), may be defined by multiple active shape models generated from clustered shape instances. It is to be noted that although the steps showed therein are delineated as separate steps, these separately delineated steps should not be construed as necessarily order-dependent in their performance.

Referring to FIG. 2, at 202, training image data is received by a computer system. An exemplary computer system 1101 is described in further detail later, with reference to FIG. 11. The training image data may be derived from test images acquired by one or more imaging modalities, such as magnetic resonance imaging (MRI), computed tomographic (CT), helical CT, x-ray, positron emission tomographic, positron emission tomographic-computed tomographic (PET-CT), fluoroscopic, ultrasound, single photon emission computed tomographic (SPECT), or other types of imaging modalities. In addition, the image data may comprise two, three, four or any other numbers of dimensions.

In one implementation, the training image data is manually segmented to provide the ground truth boundaries to develop and evaluate the performance of the hierarchical deformable model. For example, a radiologist may use a user interface at a workstation to manually identify or delineate regions of interest. A region of interest (ROI) refers to a volume or area (e.g., central slice of the volume) identified for further study and processing. For example, ROIs may be associated with sub-surfaces of a liver or a distal femur condyle surface. Other types of ROIs are also useful.

At 204, the computer system automatically constructs a hierarchical structure for facilitating spatially adaptive deformable model-based segmentation of image data. Each node of the hierarchical structure represents a cluster of vertices or sub-surface of the deformable model having relatively similar boundary characteristics. The hierarchical structure may be, for example, a tree structure that is binary or non-binary (e.g., ternary, quaternary, etc.). In addition, the hierarchical structure may be a decision tree or any other type of hierarchical structure.

In one implementation, the hierarchical structure is constructed using an iterative clustering and feature selection method, as described in more detail later in relation to FIGS. 3 and 4. Alternatively, the hierarchical structure may be constructed using a joint feature selection, clustering and classification framework, as described later with reference to FIGS. 5 and 6.

At 206, the computer system learns spatially adaptive boundary detectors learned based on nodes of the hierarchical structure. A boundary detector (or classifier) may be learned to characterize a local boundary. A boundary may be defined as a contour in the image that represents a change in voxel ownership from one surface to another. The learning technique may be a supervised learning technique, such as the AdaBoost technique. Alternatively, other methods, such as random forests or support-vector networks, may also be used. See, for example, Cortes, C. and Vapnik, V., "Support Vector Networks," Machine Learning, 20:273-297 (1995), which is hereby incorporated by reference. Other types of learning techniques, such as unsupervised or semi-supervised learning techniques may also be used.

In one implementation, an extensive redundant feature pool and a cascade AdaBoost method are used to learn the boundary detectors. A redundant feature vector $\Im(x; I)$ of vertex x of an image I may include Haar-like features. The Haar-like features may be two-dimensional (2D), three-dimensional (3D) or four-dimensional (4D), depending on the dimensionality of the imaging modality. The Haar-like features are computed by applying Haar basis functions to the image data. Other types of filters, such as steerable filters, Gabor filters, or local binary patterns, may also be used to generate other types of features.

The classifier $$C_{\hbar_{v_i}}$$

of a cluster $\hbar_{v_i}$ may be learned by applying the AdaBoost technique to the redundant feature pool $\Im(x; I)$ associated with the cluster $\hbar_{v_i}$. The AdaBoost training process is an iterative process which linearly combines weak classifiers with different weights. A cascade of AdaBoost classifiers may be used. A weak classifier is a learner which is only slightly correlated with the true classification. During each iteration, weak classifiers are trained using a weighted version of the training set. At the end of the iteration, the training set is re-weighted so that those images that were misclassified during the current iteration are boosted in importance. The effect of this boosting is to focus the subsequent training on the more difficult-to-classify cases. This allows background regions of the images to be quickly discarded while spending more computation resources on the promising regions of interest.

During the application stage (i.e., run-time), each learned boundary classifier (or detector) generates a boundary probability map P(x|I). Hence, the external energy term $E_{ext}$ of Equation (1) may be obtained by:

$$E_{ext}(v_i) = 1 - P(v_i | I) = 1 - C_{\hbar_{v_i}}(\Im(v_i; I)) \qquad (2)$$

where $\hbar_{v_i}$ is the cluster index of vertex $v_i$ and $$C_{\hbar_{v_i}}$$

denotes the corresponding classifier.

At 208, an optional step may be performed to generate active shape models. Active shape models incorporate shape statistics (or prior shape information) of the structure under study, and are used to enhance the performance of the deformable model. In one implementation, the active shape models are built based on clustered shape instances. Other methods of building active shape models are also useful. More detail of building such active shape models will be provided later. The active shape models may be used to derive the internal energy term $E_{int}$ found in Equation (1) described previously. During deformation in the application stage, the shape statistics are used to prevent the deformable surface from being misled or trapped by false local edges.

Figure 3:
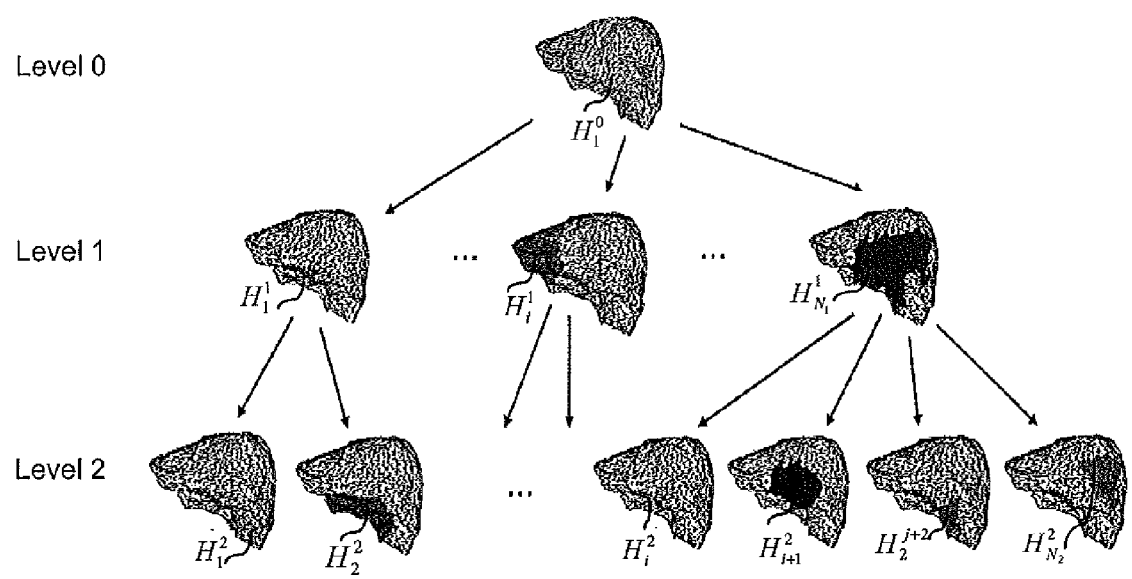
FIG. 3 shows an exemplary hierarchical structure of a deformable model.

FIG. 3 shows an exemplary hierarchical structure 300 of a deformable model of a liver. It is to be noted that while the liver model is presented for purposes of illustration, the present embodiment may be extended to other organs or structures such as the distal femur, prostate, heart, brain, kidney, lung, bladder and the like. Each node of the hierarchical structure 300 represents a sub-surface or cluster $H_i^j$ of the deformable model, the sub-surface being denoted by the shaded portion as shown in FIG. 3. For each primitive sub-surface (i.e., leaf node), a boundary detector may be learned.

Figure 4:
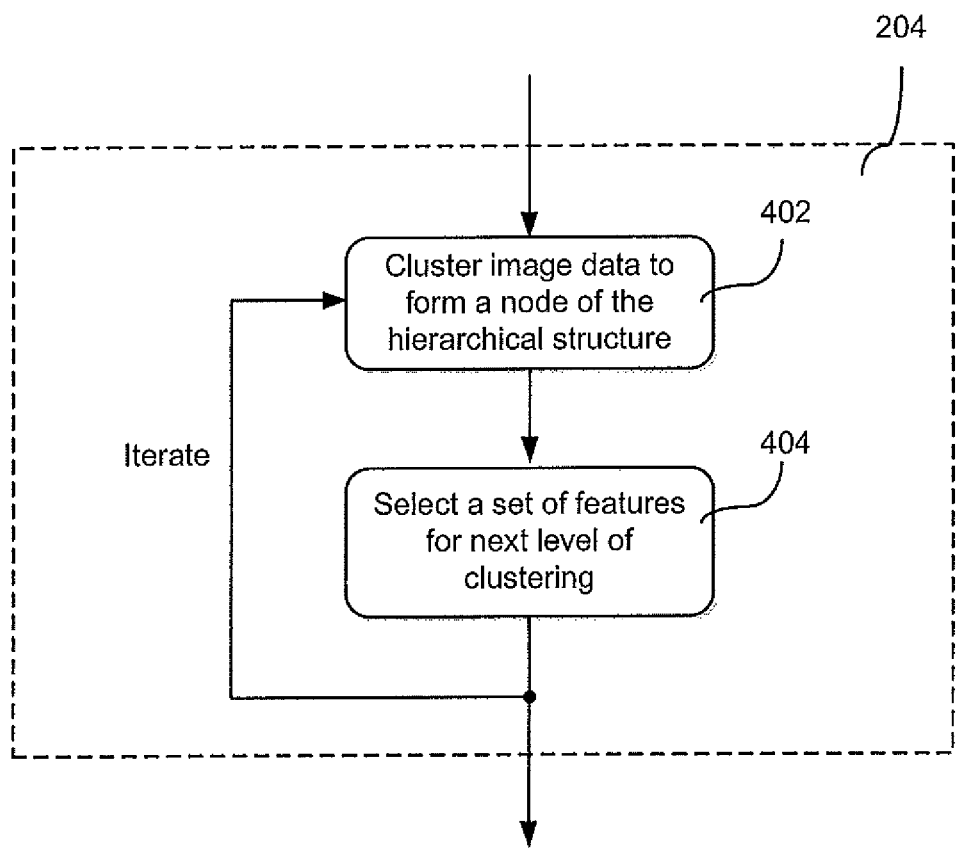
FIG. 4 shows a flowchart of an exemplary method of constructing a hierarchical structure.

FIG. 4 shows an exemplary method 204 of constructing the hierarchical structure 200.

At 402, the training image data is clustered to form a node of the hierarchical structure. In one implementation, the clustering is performed by applying an affinity propagation process to the image data (or vertices). Other methods of clustering are also useful. The purpose of clustering is to maximize class separability. It is possible to include both positive samples (i.e., boundary pixels or voxels) and negative samples (i.e., non-boundary pixels or voxels) in the same cluster, as long as they are separable. In addition, both positive and negative samples corresponding to a vertex may be used to form a feature vector. Similar samples should fall in the same cluster to provide appearance consistency. To provide local consistency, neighboring samples should fall into the same cluster.

In one implementation, affinity propagation is used to cluster the training image data. Affinity propagation is a clustering method that models each data point as a node in a network. See, for example, Frey and Dueck, "Clustering by Passing Messages Between Data Points," Science, Vol. 315 pp. 972-976 (2007), the teachings of which are hereby incorporated by reference. During the clustering process, real-valued messages are recursively exchanged between data points until a set of high quality exemplars and corresponding clusters emerge. The messages are updated based on formulas that search for the minima of an energy function. The magnitude of each message during the clustering process reflects the affinity that one data point currently has for choosing another data point as its exemplar. Each vertex is considered as a potential cluster center and the recursive process gradually generates clusters. Therefore, a major advantage of affinity propagation is that the solution is not sensitive to bad initialization or hard decisions.

Affinity propagation takes as input a collection of real-valued similarities between vertices, wherein the similarity $S(v_i, v_k)$ indicates how well a first vertex with index k is suited to be the exemplar for a second vertex with index i. It is important to design an appropriate similarity between vertices since it determines the clustering results of affinity propagation.

In the present framework, two rules may be imposed on the clustered vertices. First, to facilitate the characterization of heterogeneous boundaries, vertices in the same cluster should have relatively similar image features. Second, the hierarchical deformable model requires the vertices within a cluster to be proximal to each other on the surface. In this way, the cluster center can be treated as a "driving vertex" and drive its neighborhood in the deformation process.

To implement these two rules, the similarity S between vertices $v_i$ and $v_k$ may be defined as follows in Equation (3):

$$S(v_i, v_j) = 1 - (1/K) \sum_{k=1}^{K} [\alpha G(v_i^k, v_j^k) + (1 - \alpha) C(F(v_i^k), F(v_j^k))] \qquad (3)$$

wherein K is the number of training subjects, $v_i^k$ denotes the ith vertex of the kth subject. $G(v_i^k, v_j^k)$ denotes the geodesic distance between $v_i^k$ and $v_j^k$; and $C(F(v_i^k), F(v_j^k))$ denotes the Euclidean distance between image feature vectors calculated at $v_i^k$ and $v_j^k$.

The affinity propagation process may be applied to the vertices recursively to construct the hierarchical structure 300 of the deformable model. Referring back to FIG. 3, assuming $H_i^j$ is the ith cluster at the jth hierarchical level, vertices belonging to $H_i^j$ are further clustered to a set of sub-clusters $\{H_k^{j+1}, k=1, \ldots, N_i\}$, as shown in the following Equations (4):

$$H_i^j = \bigcup_{k=1}^{N_i} H_k^{j+1} \text{ and } \bigcap_{k=1}^{N_i} H_k^{j+1} = \emptyset \tag{4}$$

Referring to FIG. 4, at 404, the appropriate feature set F(.) is selected. Feature selection is a technique that selects a subset of relevant features so as to improve the performance of the learning model. In one implementation, the top features that provide highest accuracies for classification are selected for the next level of clustering. In particular, the selected feature set F(.) may be used in Equation (3) during the next level of clustering at 402.

The selection of features poses an "egg-and-chicken" problem. On one hand, the distinctive feature sets for boundary description must be known to obtain the desired clusters. On the other hand, distinctive features for the local boundaries can be obtained only after obtaining the clusters. To address this problem, the present framework uses an exemplary iterative clustering and feature selection method.

In one implementation, an initial feature set F(.) is determined before the clustering 402 is first performed to generate the first level $H_i^1$ of the hierarchical structure. The initial feature set F(.) may comprise the intensity profile along the normal of each vertex Other ways of defining the initial feature set F(.) are also useful.

After the first round of clustering, a learning-based method may be used to select the critical features from a large feature pool. Assuming that $H_i^j=\{v_1\}$, the critical features are the ones with the greatest relative ability to distinguish $\{v_1\}$ from the points along their normal directions. The set of selected features is used as F(.) in the similarity function $S(v_i, v_j)$, as shown in Equation (3) above, to further cluster $\{v_1\}$ to a set of sub-clusters $\{H_k^j, k=1, \ldots, N_i\}$, where j denotes the hierarchical level, and k denotes the index within the hierarchical level.

In one implementation, the AdaBoost (or Adaptive Boosting) method is used to select the critical features with maximum discrimination power. The original AdaBoost method was first developed by Yoav Freund and Robert Shapire, and applied to real-time face detection in Paul Viola and Michael J. Jones, "Robust Real-Time Object Detection," International Conference on Computer Vision, 57(2): 137-154 (2004), which is hereby incorporated by reference. Alternatively, other methods, such as random forests, may also be used to select the features. See, for example, Breiman, Leo, "Random Forests," Machine Learning, 45(1): 5-32 (2001), which is hereby incorporated by reference.

Steps 402 and 404 are iteratively executed until a terminating condition is met. The terminating condition may be met when boundary characteristics within a primitive cluster (i.e., leaf node) become learnable. The terminating condition may be met if, for example, the training error of the samples in a primitive cluster is less than a pre-determined threshold (e.g., 5%). Other types of terminating conditions are also useful.

Figure 5:
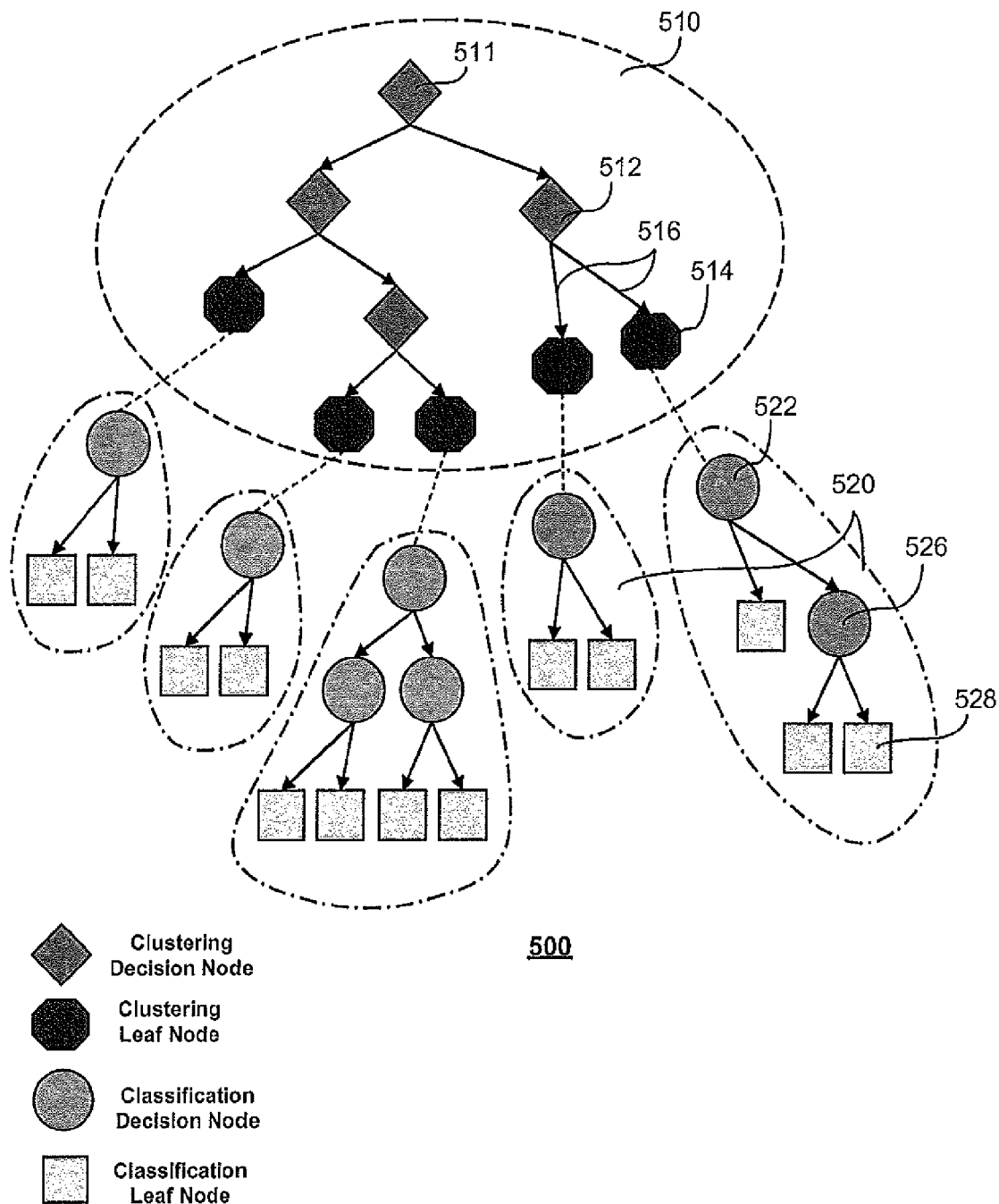
FIG. 5 shows another exemplary hierarchical structure of a deformable model.

FIG. 5 shows another example of a hierarchical structure 500 to facilitate spatially adaptive deformation model-based segmentation. In one implementation, the hierarchical structure 500 comprises a binary decision tree 500. In general, a decision tree is a classifier in the form of a tree structure, which predicts the value of a target variable based on several input variables. In one implementation, the decision tree comprises a clustering tree 510 and individual cluster node classifiers 520 built at the clustering leaf nodes 514 of the clustering tree 510. In one implementation, the clustering tree 510 encodes clustering information for boundary vertices. Each vertex corresponds to a voxel (or pixel) or a subset of voxels (or pixels). The voxel may be classified as "boundary" or "non-boundary" voxels by the cluster node classifier 520. Other types of classes are also useful.

The clustering tree 510 comprises a clustering root node 511, at least one clustering decision node 512 and at least one clustering leaf node 514. A cluster node classifier 520 corresponds to a clustering leaf node 514. The cluster node classifier 520 comprises at least one classification root node 522, at least one classification decision node 526 and at least one classification leaf node 528. The cluster node classifier 520 may be, for example, random decision tree classifier.

The root node 511 of the decision tree 500 may be defined as follows:

$$S = \{(x_i, y_i)_{i=1}^n : y_i \in \{1, 2, \ldots, C\}\} \tag{5}$$

wherein $y_i$ is the target variable (i.e. class label), $x_i$ is a vector comprising input variables $(x_1, x_2, x_3 \ldots x_n)$, n is the number of boundary vertices (or points) and C is the number of classes. In one implementation, the number of classes (C) is two, wherein one class is labeled as a boundary class, and the other class is a non-boundary class. Other types of classes are also useful.

The tree 500 may be constructed by recursively splitting a decision node (512, 522, 526) into sub-sets by applying an attribute value test. In one implementation, a decision node (512, 522, 526) may be split into two sub-sets ($S_{left}$ and $S_{right}$) by decision stump (6):

$$S_{left} = \{(x_i, y_i)_{i=1}^{n_i} : f_k(x_i) \leq \theta_k\} \tag{6}$$
$$S_{right} = \{(x_i, y_i)_{i=1}^{n_i} : f_k(x_i) > \theta_k\}$$

wherein $f_k$ represents the kth feature and $\theta_k$ represents the corresponding threshold value. The splitting criteria $\Gamma$ may be optimized for feature selection, as follows:

$$(f_k, \theta_k) = \underset{f, \theta}{argmax} \Gamma(S, f, \theta) \tag{7}$$

The recursion may be completed when splitting no longer adds value to the predictions, or when the desired classification output is reached.

The decision tree 500 may be used to classify a voxel (or pixel) in a sample image by starting at the root 511 of the tree and moving through it until the classification leaf node 528. In one implementation, the classification leaf node 528 provides a conclusion about whether the voxel (or pixel) belongs to a boundary class or not. In other words, the leaf nodes 528 may represent voxel classifications and the branches 516 represent conjunctions of input values that lead to those voxel classifications. In particular, if the majority of the training samples in the leaf node 528 belong to class c, the leaf node 528 represents class c. During application stage (or run-time), if the test sample voxel moves down the binary tree from the root 511 and finally reaches leaf node 528, then a conclusion is drawn that it belongs to class c.

Figure 6A:
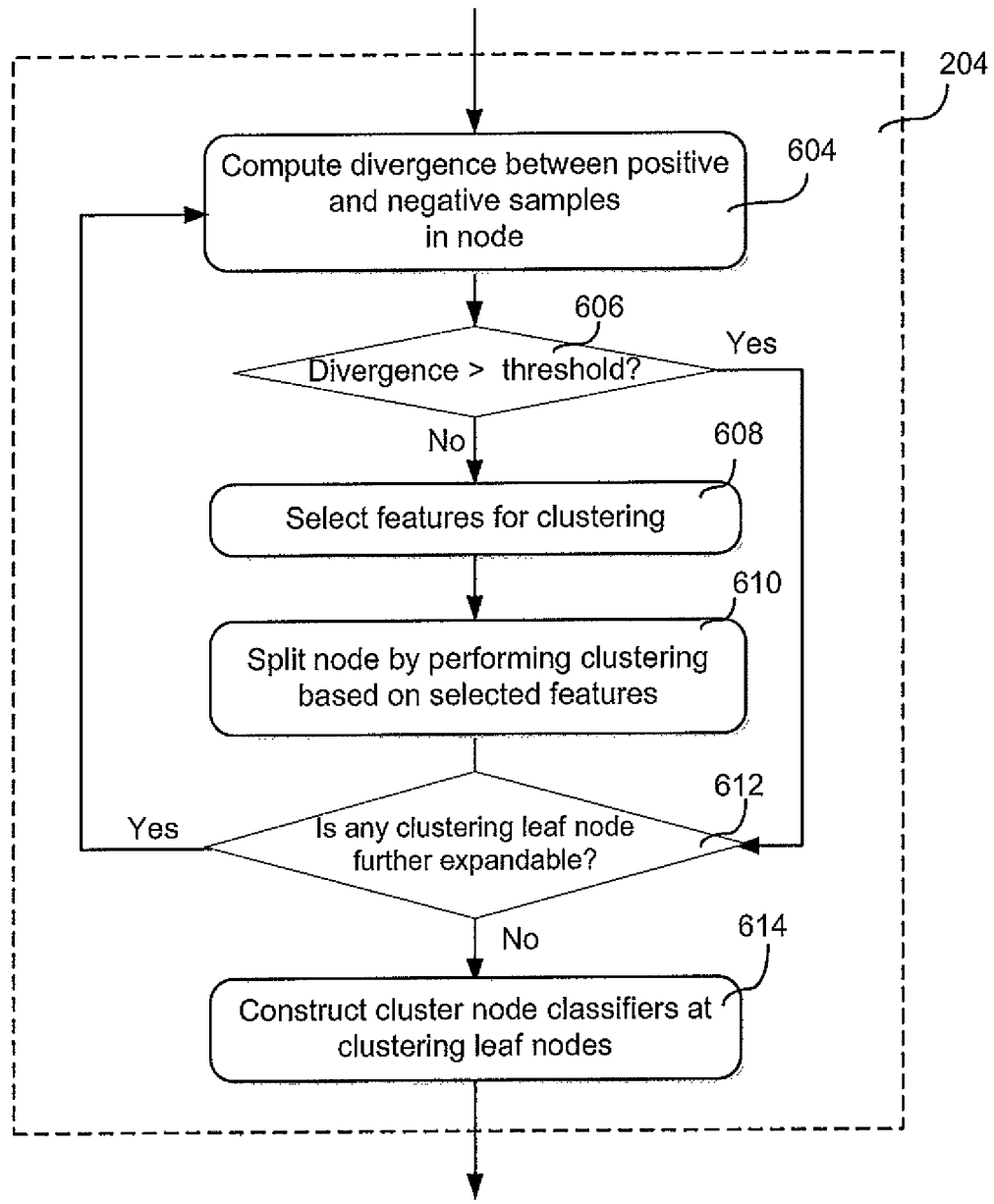
FIG. 6a shows a flowchart of another exemplary method of constructing a hierarchical structure.

FIG. 6a shows an exemplary method 600 for automatically constructing the decision tree 500 by a computer system. As previously discussed, the decision tree 500 comprises a clustering tree 510 and individual cluster node classifiers 522 corresponding to clustering leaf nodes 514 of the clustering tree 510, as shown in FIG. 5. As illustrated by FIG. 6, the clustering tree 510 may be built recursively by performing steps 604-612. The clustering tree 510 may be built, for example, by splitting nodes recursively until the divergence between positive and negative samples (or voxels) in the nodes are large enough. The cluster node classifiers may then be built at the clustering leaf nodes by performing step 614.

At 604, the divergence between the positive and negative samples (or voxels) in a node under study is computed. In one implementation, the divergence comprises a Kullback-Leibler (KL) divergence, which provides a measure of class separability. Other measures of divergence, such as Euclidean distance, mutual information or the like, may also be used.

At 606, the computed divergence is compared with a pre-determined threshold value. The pre-determined threshold value may be, for example, 0.01 or any other suitable values. If the divergence is greater than the threshold value, no splitting is performed on the node. If the divergence is not greater than the threshold value, the node is split by clustering the vertices. The maximum number of clusters is thereby dependent on the maximum depth of the clustering tree (i.e., classification complexity).

At 608, features are selected for clustering. In one implementation, a random sample from a pool of multiple weak features is selected for each vertex. Alternatively, the feature with the highest divergence between the positive and negative samples is selected. Other methods of feature selection are also useful.

Figure 6B:
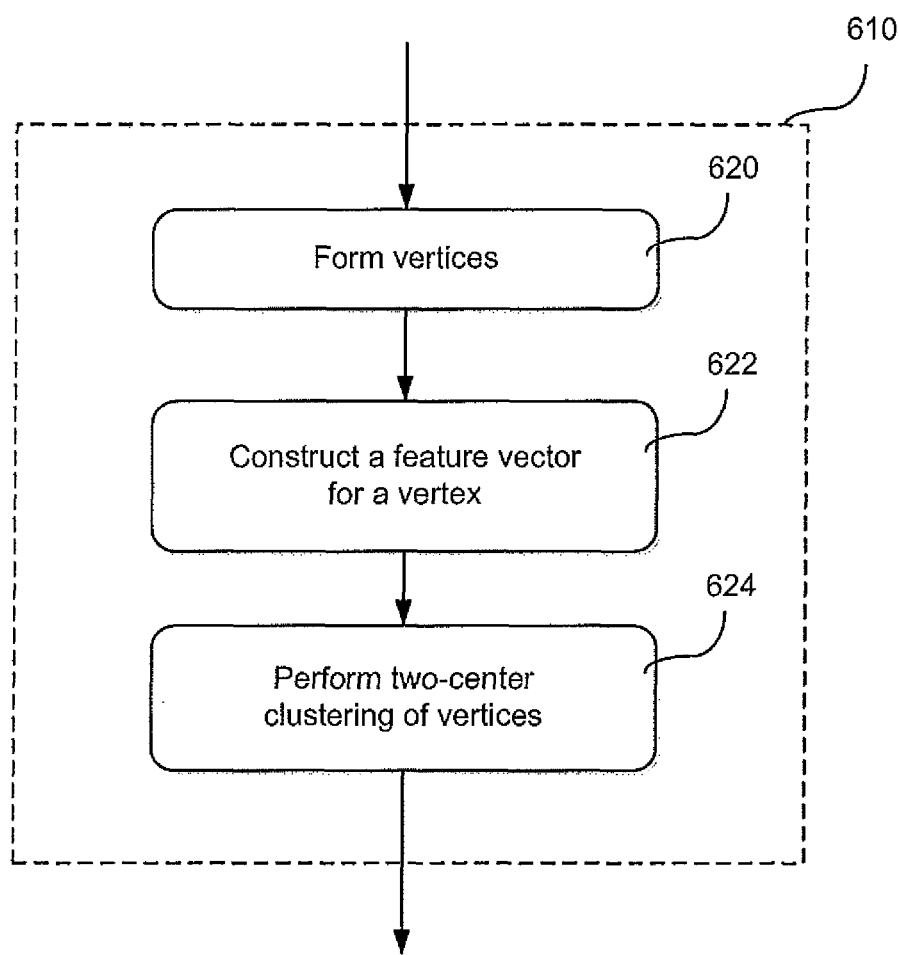
FIG. 6b shows a flowchart of an exemplary clustering method.

At 610, the node is split by performing vertex clustering. In one implementation, vertex clustering is performed by using a 2-center clustering technique. Other types of clustering techniques are also useful. FIG. 6b shows an exemplary clustering method 610.

At 620, vertices are formed for clustering. A vertex may be formed by grouping positive samples with negative samples in a direction normal to the boundary. Positive samples may be defined as the voxels lying along the boundary of a region-of-interest. Negative samples may be defined as the voxels not lying along the boundary. Other methods of defining positive and negative samples are also useful. The number of voxels grouped together may be, for example, 3, 4, 5 or any other number. Other methods of forming the vertices are also useful.

At 622, a feature vector is constructed for each vertex. In one implementation, the feature vector is constructed by applying a weak feature on the voxels of each vertex. The selection of the weak feature was described previously with respect to 608, with reference to FIG. 6a.

At 624, two-center clustering is performed on the vertices. In one implementation, the two-center clustering is performed based on pair-wise similarities between vertices. The pair-wise similarities include, for example, appearance and spatial similarities between pairs of vertices. In one implementation, the pair-wise similarities are represented by constructing an affinity matrix of pair-wise distances between pairs of vertices ($v_i$, $v_j$). Other types of representations are also useful.

The spatial term ($d_s$) of a pair-wise distance, which captures the spatial similarity between any pair of vertices ($v_i$, $v_j$), may be expressed as follows:

$$d_s(v_i, v_j) = \|x_i - x_j\|_g \quad (8)$$

The appearance term ($d_f$) of the pair-wise distance, which captures the appearance similarity between any two vertices ($v_i$, $v_j$), may be expressed as follows:

$$d_f(v_i, v_j) = \|f_i - f_j\|_2 \quad (9)$$

Referring back to FIG. 6a, at 612, the computer system checks to determine if any clustering leaf node is further expandable. If yes, the computer system repeats steps 604 to 610 to process the clustering leaf node.

At 614, if no clustering nodes remain to be processed, the computer system constructs cluster node classifiers at the clustering leaf nodes of the clustering tree. The cluster node classifiers may be trained to classify positive and negative samples (or voxels) into boundary and non-boundary classes. In one implementation, the cluster node classifiers comprise random tree classifiers (or random forests). Other types of cluster node classifiers may also be constructed.

Figure 7:
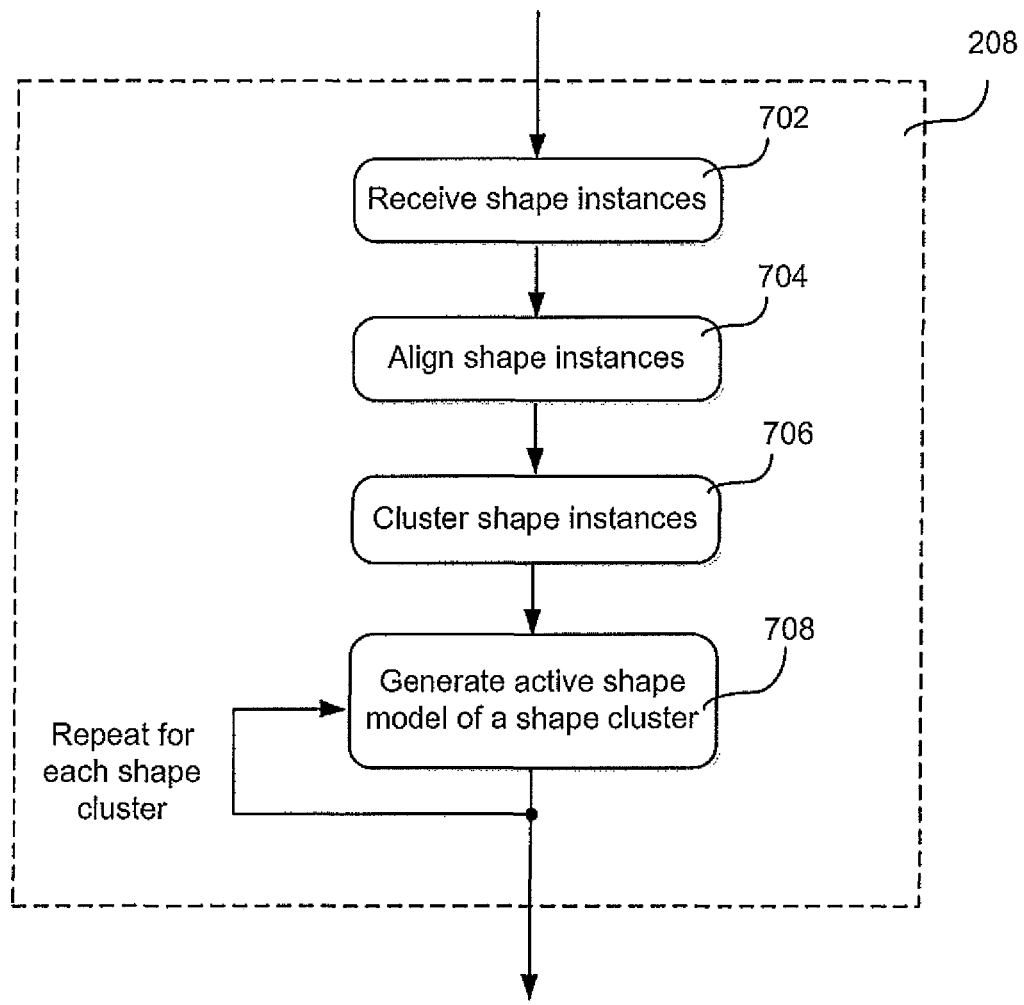
FIG. 7 shows a flowchart of an exemplary for constructing active shape models.

FIG. 7 shows a method 208 for constructing active shape models from clustered shape instances. One problem with conventional active shape models is that they are built upon the whole population of shape instances, following the assumption that the shape instances follow a mono-Gaussian distribution in the shape space. This assumption may not always be valid for some organs or structures. To effectively incorporate non-Gaussian shape priors, the present framework clusters shape instances before building multiple statistical shape models based on the clustered shape instances.

At 702, a set of training shape instances is received. The shape instances may be derived from the training image data. Further, the shape instances may include a set of landmarks (or labeled point features). The landmarks may be manually selected by a skilled user.

At 704, the shape instances are aligned to allow the shape instances to be studied in a common coordinate frame. The alignment may be achieved by aligning the landmarks in an image, using transformation operations such as translation, rotation and scaling. Other methods of achieving a common coordinate frame may also be used.

At 706, the shape instances are clustered. Affinity propagation may be used for shape clustering. Other clustering methods, such as k-means clustering, may also be used. In one implementation, clustering is performed according to pair-wise shape similarity. The shape similarity may be defined by the Euclidean distance between two shape vectors. Other measures of shape similarity are also useful.

At 708, an active shape model is built for each shape cluster. One method of constructing active shape models is described in the paper by Cootes, T., and Taylor, C. J., Cooper, D. H., Graham, J., "Active shape models—their training and application," Computer Vision and Image Understanding, 61(1): 38-59 (1995), which is hereby incorporated by reference. Other methods of constructing active shape models are also useful.

During the application stage, the deformable model-based segmentation is constrained by the most similar active shape model. More specifically, the deformable model is mapped to the eigenspace of each shape cluster, respectively. The statistical shape model that gives the most compact description is selected to refine the deformable model. The most compact description is determined by evaluating $e^{(-S-S_i)^T \Xi_i (-S-S_i)}$ and picking the $S_i$ with the maximum value. Hence, the internal energy of $E_{int}$ may be formulated as:

$$E_{int}(S) = 1 - \max_i e^{(-S-S_i)^T \Theta_i (-S-S_i)} \quad (11)$$

where $S_i$ and $\Xi_i$ denote the average shape and the covariance matrix of the ith shape cluster, respectively.

Application Stage

Figure 8:
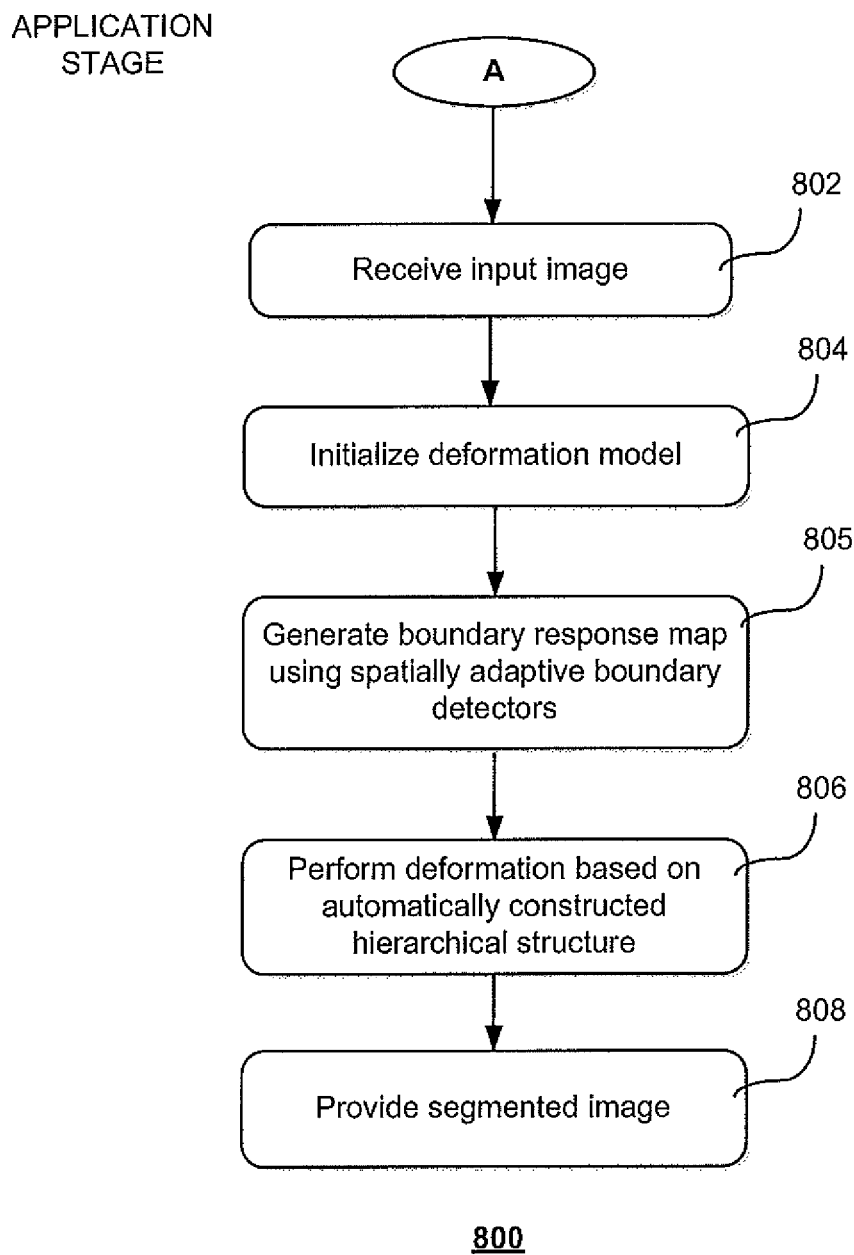
FIG. 8 shows a flowchart of an exemplary application stage.

FIG. 8 shows the exemplary steps that may be carried out during the application (i.e., online or run-time) stage. The application stage may use the hierarchical model, learned boundary detectors and statistical active shape models, generated as described above, to guide the deformable model to the desired structure boundary (i.e. optimal solution). It is to be noted that although the steps showed therein are delineated as separate steps, these separately delineated steps should not be construed as necessarily order-dependent in their performance.

At 802, an input image to be segmented is received. The input image may be acquired by an imaging modality, such as magnetic resonance imaging (MRI), computed tomographic (CT), helical CT, x-ray, positron emission tomographic, positron emission tomographic-computed tomographic (PET-CT), fluoroscopic, ultrasound, single photon emission computed tomographic (SPECT), or other types of imaging modalities. In addition, the new image may be pre-processed by applying a filter, such as an anisotropic median filter, to remove noise or other image artifacts. Other types of filters or pre-processing may also be applied.

At 804, the deformable model is initialized. In one implementation, the model is initialized by a landmark-based registration method. In particular, the surface model may be initialized in the image space by an affine registration based on automatically detected landmarks. Other types of initialization methods may also be used.

At 805, the computer system generates a boundary response map using spatially adaptive boundary detectors. The spatially adaptive boundary detectors may be automatically learned using the present framework, as previously described. The boundary response map captures the probabilities of voxels belonging to a boundary class, and may be generated by applying a learned spatially adaptive boundary detector to each voxel.

At 806, deformation is performed on the input image by using the hierarchical structure and the boundary response map to guide the deformation model to the desired boundary. The hierarchical structure may be automatically constructed by the computer system, as discussed in the previous sections. Each node in the hierarchical structure is used to determine which vertices are driven in response to the same boundary detector (i.e. deformed together). Since the boundary detectors of the hierarchical structure are spatially adaptive, deformation is therefore performed at different levels, thereby achieving higher accuracy and efficiency.

The model is deformed by minimizing the energy function (1), which was previously discussed. The deformable model may be constrained by statistical shape models to be in the allowable shape space, as discussed previously. The deformation process is iteratively performed until the model converges to an optimal boundary solution.

Finally, at 808, the segmented image is provided. The region of interest in the final segmented image is delineated by the boundary detected as a result of the deformation process. The resolution of the deformed model may be refined by up-sampling the segmentation result to the next higher resolution. Other types of refinement may also be applied.

Experimental Results

The present framework was employed in liver segmentation (closed surface) in whole body PET-CT in which the CT has very low resolution and low contrast. Whole body PET-CT provides fused morphological and functional information, which benefits cancer diagnosis and therapy evaluation. As the standardized uptake value of liver is usually higher than surrounding tissues, it is desirable to segment liver from the PET-CT image for an organ-specific PET-CT interpretation. In this experiment, the learning-based hierarchical model was trained by 20 whole body PET-CT scans with manually delineated liver surfaces.

Figure 9:
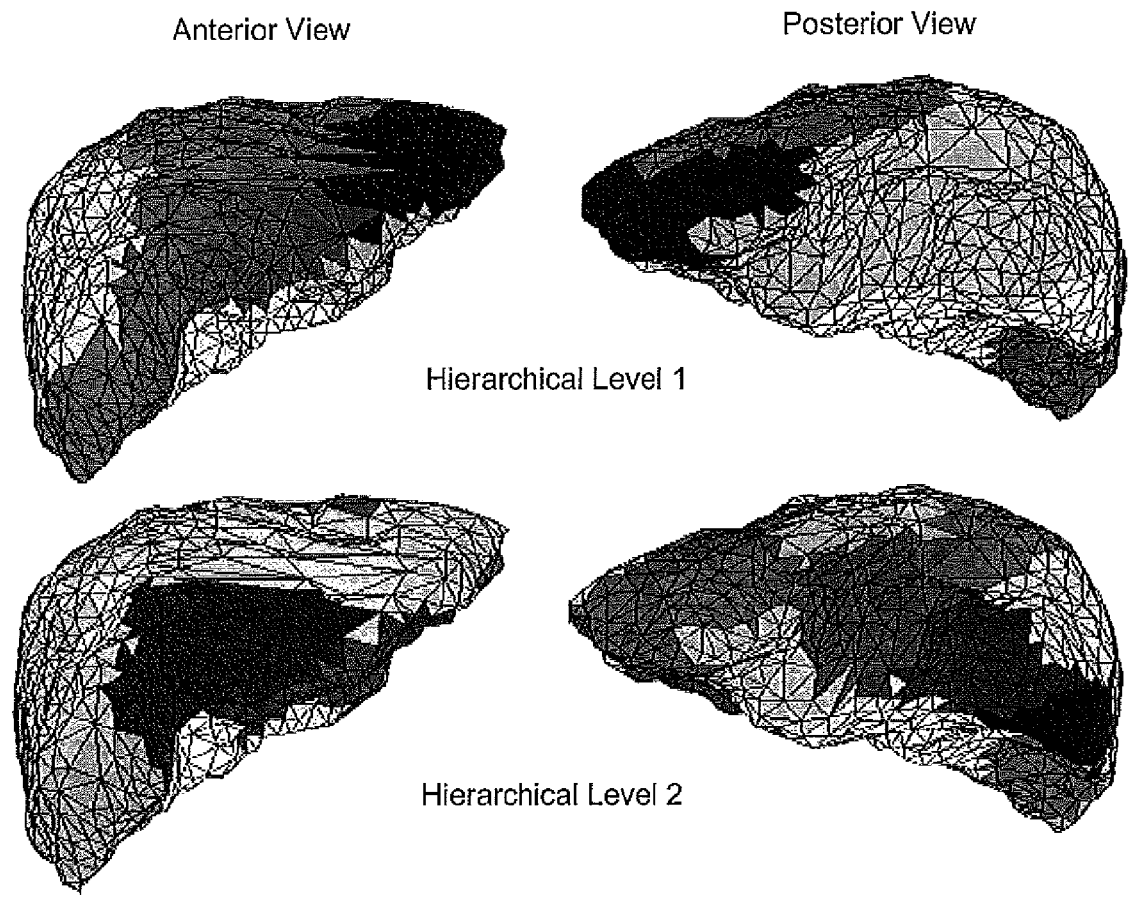
FIG. 9 shows exemplary renderings of a hierarchical structure.

FIG. 9 shows 3D renderings 900 of a hierarchical structure of an exemplary liver model. The shaded patches denote vertices belonging to the same cluster. The renderings on the left side show the anterior view of the liver model, while the renderings on the right side show the posterior view of the liver model. The liver model has two hierarchical levels with 8 and 25 vertices clusters, respectively. The automatic segmentation results on a dataset of 30 images (PET: 5×5×5 mm; CT: 1.3×1.3×5 mm) are compared with manually delineated organ surfaces.

FIG. 10 shows the quantitative comparison of the present hierarchical deformable model (i.e., Method 1) with a heuristically designed deformable model (i.e., Method 2), as applied to PET-CT liver segmentation. Quantitative measurements, including median distance between surfaces, average distance between surfaces, volume difference and volume overlap difference, are tabulated as shown in FIG. 10. The tabulated quantitative comparison reveals that the present hierarchical deformable model exhibits superior performance (e.g. lower volume error) over the heuristically designed deformable model.

Exemplary System

Figure 11:
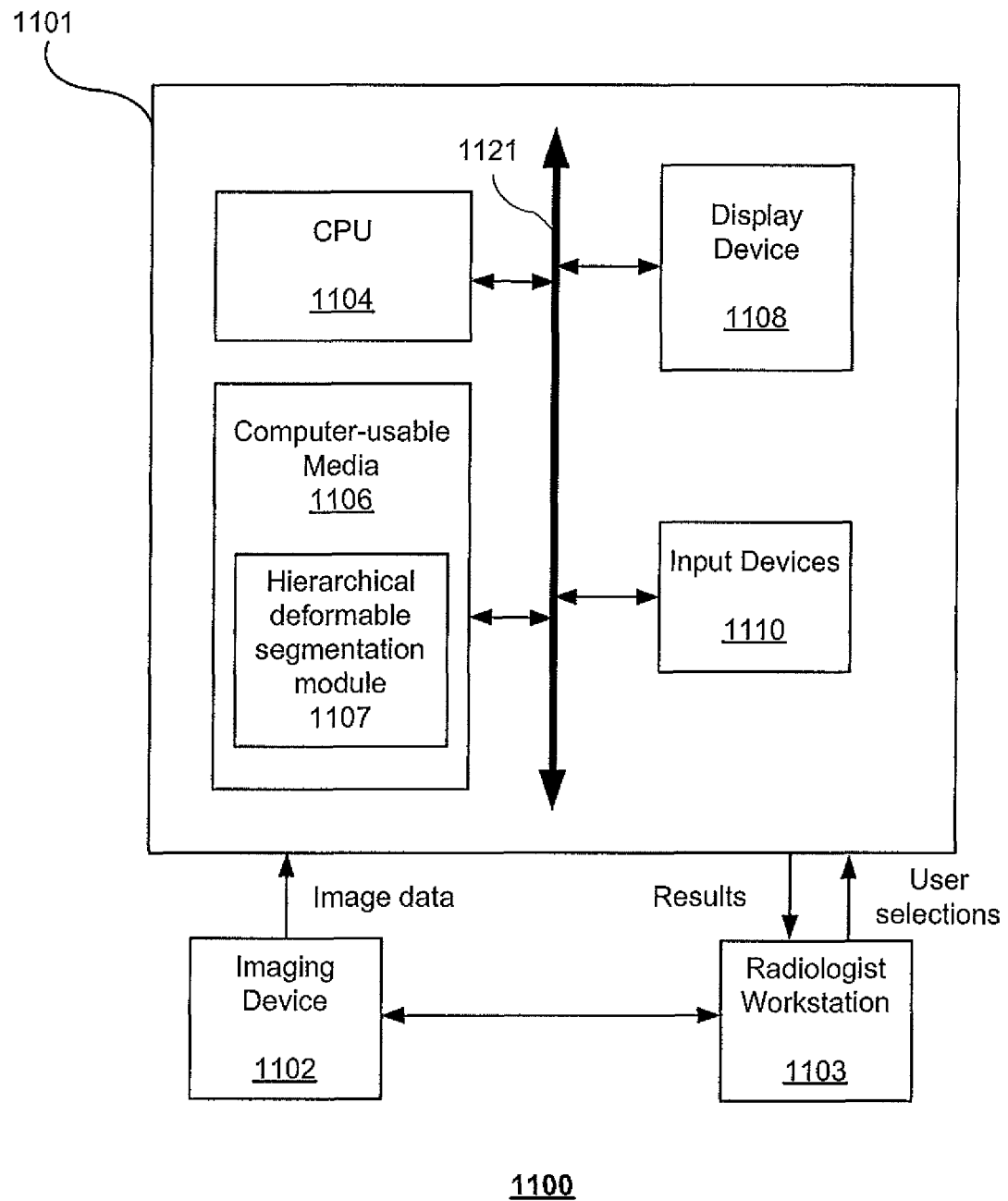
FIG. 11 shows a block diagram of an exemplary computer system.

FIG. 11 shows a block diagram illustrating an exemplary computer-aided diagnosis (CAD) system 1100. The CAD system 1100 includes a computer system 1101 for implementing the framework as described hereby. The computer system 1101 may be further connected to an imaging device 1102 and a radiologist workstation 1103, over a wired or wireless network. The imaging device 1102 may be a radiology scanner such as a MR scanner or a PET/CT scanner.

Computer system 1101 may be a desktop personal computer, a portable laptop computer, another portable device, a mini-computer, a mainframe computer, a server, a storage system, a dedicated digital appliance, or another device having a storage sub-system configured to store a collection of digital data items. In one implementation, computer system 1101 comprises a processor or central processing unit (CPU) 1104 coupled to one or more computer-usable media 1106 (e.g., computer storage or memory), display device 1108 (e.g., monitor) and various input devices 1110 (e.g., mouse or keyboard) via an input-output interface 1121. Computer system 1101 may further include support circuits such as a cache, power supply, clock circuits and a communications bus.

It is to be understood that the present technology may be implemented in various forms of hardware, software, firmware, special purpose processors, or a combination thereof. Computer-usable media 1106 may include random access memory (RAM), read only memory (ROM), magnetic floppy disk, flash memory, and other types of memories, or a combination thereof.

In one implementation, the techniques described herein may be implemented as computer-readable program code, such as hierarchical deformable segmentation module 1107, which is tangibly embodied in computer-usable media 1106. The computer-readable program code may be executed by CPU 1104 to process images (e.g., MR or CT images) from the imaging device 1102 (e.g., MRI or CT scanner). As such, the computer system 1101 is a general-purpose computer system that becomes a specific purpose computer system when executing the computer readable program code. The computer-readable program code is not intended to be limited to any particular programming language and implementation thereof. It will be appreciated that a variety of programming languages and coding thereof may be used to implement the teachings of the disclosure contained herein.

Computer system 1101 may also include an operating system and microinstruction code. The various techniques described herein may be implemented either as part of the microinstruction code or as part of an application program or software product, or a combination thereof, which is executed via the operating system. Various other peripheral devices, such as additional data storage devices and printing devices, may be connected to the computer system 1101.

The radiologist workstation 1103 may include a computer and appropriate peripherals, such as a keyboard and display, and can be operated in conjunction with the entire CAD system 1100. For example, the radiologist workstation 1103 may communicate with the imaging device 1102 so that the image data collected by the imaging device 1102 can be rendered at the radiologist workstation 1103 and viewed on the display. The radiologist workstation 1103 may include a user interface that allows the radiologist or any other skilled user (e.g., physician, technician, operator) to manipulate the image data. For example, the radiologist may manually segment or identify regions of interest in the image data, or annotate the regions of interest using pre-defined descriptors via the user-interface. Further, the radiologist workstation 1103 may communicate directly with the computer system 1101 to access and display previously processed image data (e.g., segmentation results) so that a radiologist can manually verify the results of the present framework.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A method for facilitating deformable model-based segmentation of image data, comprising:
    receiving, by a computer system, training image data;
    automatically constructing, by the computer system, based on the training image data, a hierarchical structure comprising multiple nodes, wherein a node represents a cluster of vertices having relatively similar characteristics; and
    learning, by the computer system, at least one spatially adaptive boundary detector based on a node of the hierarchical structure
    wherein the step of automatically constructing the hierarchical structure comprises performing a process including if a divergence between positive and negative samples in a node of the hierarchical structure is less than a pre-determined threshold, splitting the node by performing clustering based on selected features.

2. The method of claim 1 wherein the step of automatically constructing the hierarchical structure comprises performing an iterative process comprising:
    clustering the training image data to form a node of the hierarchical structure; and
    selecting a set of features for a next level of the clustering.

3. The method of claim 2 wherein the step of clustering comprises applying affinity propagation to the training image data.

4. The method of claim 2 further comprises determining an initial set of features for the clustering by determining an intensity profile along a normal of a vertex.

5. The method of claim 2 wherein the step of selecting the set of features comprises selecting the features with highest accuracies for classification.

6. The method of claim 2 wherein the step of selecting the set of features comprises applying an AdaBoost method.

7. The method of claim 2 wherein the step of selecting the set of features comprises applying a random forest-based method.

8. The method of claim 1 wherein the step of learning the at least one spatially adaptive boundary detector comprises applying a supervised learning method.

9. The method of claim 8 wherein the step of learning the at least one spatially adaptive boundary detector comprises applying an AdaBoost method.

10. The method of claim 1 wherein the step of learning the at least one spatially adaptive boundary detector comprises applying a random forest-based method.

11. The method of claim 1 wherein the step of learning the at least one spatially adaptive boundary detector comprises applying a support vector-based method.

12. The method of claim 1 wherein the hierarchical structure comprises a binary decision tree.

13. The method of claim 12 wherein the hierarchical structure comprises a clustering tree and multiple cluster node classifiers constructed at clustering leaf nodes of the clustering tree.

14. The method of claim 1 wherein the divergence comprises a Kullback-Leibler (KL) divergence.

15. The method of claim 1 further comprising:
    selecting features for the clustering by randomly sampling from an extensive redundant feature pool.

16. The method of claim 1 wherein the step of splitting the node comprises performing clustering of vertices in the node.

17. The method of claim 16 wherein the step of performing the clustering comprises:
    forming vertices;
    constructing a feature vector for a vertex; and
    performing two-center clustering of the vertices based on pair-wise similarities between the vertices.

18. The method of claim 17 wherein the step of forming the vertices comprises grouping at least one positive sample and at least one negative sample.

19. The method of claim 17 wherein the step of constructing the feature vector comprises applying a weak feature on voxels of the vertex.

20. The method of claim 1 further comprising:
    clustering shape instances in the training image data; and
    constructing multiple active shape models, based on the clustered shape instances, for constraining the deformable model-based segmentation.

21. A method of image segmentation, comprising:
    receiving, by a computer system, an input image;
    initializing, by the computer system, a deformable model; and
    performing, by the computer system, deformation on vertices of the input image using a hierarchical structure with spatially adaptive boundary detectors to guide the deformable model to a boundary,
    wherein said hierarchical structure is automatically constructed, by the computer system, based on training image data,
    wherein a node of the hierarchical structure represents vertices that are driven in response to a same boundary detector;
    wherein the step of automatically constructing the hierarchical structure comprises performing a process including if a divergence between positive and negative samples in a node of the hierarchical structure is less than a pre-determined threshold, splitting the node by performing clustering based on selected features.

22. A non-transitory computer usable medium having a computer readable program code tangibly embodied therein, said computer readable program code adapted to be executed by a processor to implement a method for facilitating deformable model-based segmentation of image data, comprising:
   receiving training image data;
   automatically constructing, based on the training image data, a hierarchical structure comprising multiple nodes, wherein a node represents a cluster of vertices having relatively similar characteristics; and
   learning at least one spatially adaptive boundary detector based on a node of the hierarchical structure;
   wherein the step of automatically constructing the hierarchical structure comprises performing a process including if a divergence between positive and negative samples in a node of the hierarchical structure is less than a pre-determined threshold, splitting the node by performing clustering based on selected features.

23. A system for facilitating deformable model-based segmentation of image data, comprising:
   a memory device for storing computer readable program code; and
   a processor in communication with the memory device, the processor being operative with the computer readable program code to:
   receive training image data;
   automatically construct, based on the training image data, a hierarchical structure comprising multiple nodes, wherein a node represents a cluster of vertices having relatively similar characteristics, wherein automatically constructing the hierarchical structure further comprises performing a process including if a divergence between positive and negative samples in a node of the hierarchical structure is less than a pre-determined threshold, splitting the node by performing clustering based on selected features; and
   learn at least one spatially adaptive boundary detector based on a node of the hierarchical structure.

* * * * *